Dec. 2, 1947. W. N. FENNEY 2,431,857
METHOD OF OPERATING INTERNAL-COMBUSTION ENGINES
Filed Dec. 31, 1943
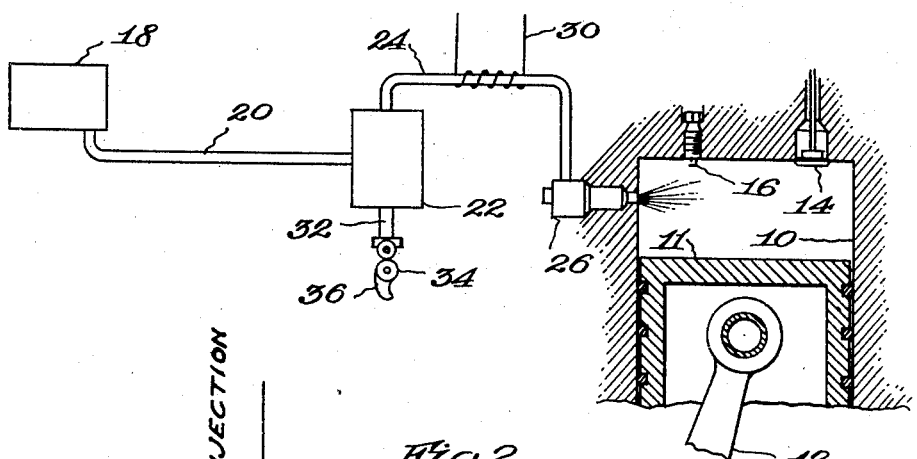
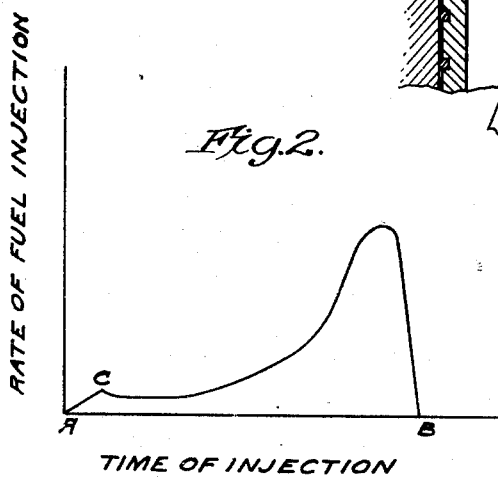
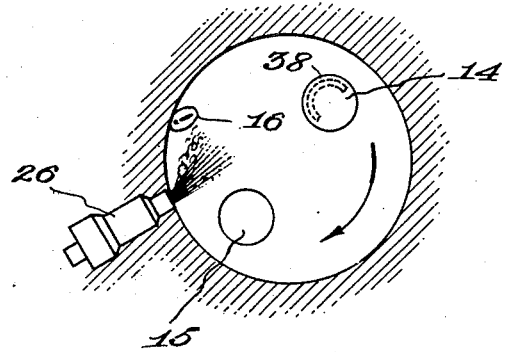
WILLIAM N. FENNEY
INVENTOR.
BY
HIS ATTORNEYS Patented Dec. 2, 1947

2,431,857

UNITED STATES PATENT OFFICE 2,431,857

METHOD OF OPERATING INTERNAL-COMBUSTION ENGINES

William N. Fenney, New York, N. Y., assignor, by mesne assignments, to The Texas Company, New York, N. Y., a corporation of Delaware Application December 31, 1943, Serial No. 516,332

1 Claim. (Cl. 123—32)

This invention relates to a fuel-injection spark-ignition internal combustion engine operating with non-knocking combustion.

The invention constitutes a modification of the basic method disclosed in the co-pending application of Everett M. Barber, Serial No. 513,232, filed December 7, 1943, as a continuation-in-part of Serial No. 463,031, filed October 23, 1942. This embodiment utilizes the basic principles set forth in said mentioned earlier application involving the injection of fuel into a localized portion of compressed air within the cylinder combustion space, the prompt spark ignition of the resulting combustible fuel vapor-air mixture from the first increment of injected fuel substantially as soon as formed to establish a traveling flame front, and the continued injection of fuel shortly in advance of the traveling flame front while moving the locus of injection and the compressed air relatively to each other in an orderly manner in said combustion space to progressively form additional combustible fuel-vapor air mixture immediately in advance of the traveling flame front to be ignited thereby and burned substantially as rapidly as formed. As a preferred embodiment, the relative movement between the locus of fuel injection and the compressed air is obtained by utilizing a high velocity induction air swirl within the combustion space. Fuel injection is initiated during the latter part of the compression stroke, preferably about 75–40° before top dead center, and is completed or substantially completed somewhat before or around top dead center.

As distinguished from said prior application wherein conventional fuel injection equipment operating at a substantially constant rate during the injection period of each cycle is employed, the present invention involves a variable rate of fuel injection during the injection period of each cycle, starting at a relatively low rate and terminating at a relatively high rate, so that the greater part of the fuel injected on each cycle is introduced during the latter half of the injection period.

A principal object of the present invention is to improve the combustion efficiency of the engine of said prior application, and to effect the main increase in combustion pressure largely in the neighborhood of top dead center and at a time when the piston has substantially completed movement on its compression stroke.

Other objects of the invention will in part be obvious and will in part appear as the description proceeds.

In accordance with the present invention, increased efficiency of operation of an internal combustion engine involving fuel injection and spark ignition (including equivalent means of extraneous ignition) of the injected fuel soon after injection, for example, an engine of the type discussed above, is obtained by varying the rate at which the fuel is injected into the combustion chamber so that only a small proportion of the total amount of the fuel is injected during the early stages of the injection period, and the bulk of the fuel is injected during the latter stages.

The invention may involve the injection of fuel over periods of time or crank angle degrees similar to those employed in methods utilizing a relatively constant rate of injection. The initial rate of injection, however, is preferably such as to be only sufficient to establish a flame front. By proceeding in this way, important advantages are obtained. For example, the increase in pressure in the combustion chamber due to combustion is maintained relatively small during the initial period of injection when its momentary action is to resist, rather than aid, the useful movement of the piston. At the same time, the regulated course of combustion is begun so that when the bulk of the fuel is injected during the latter stages of the injection period, this may be burned uniformly with avoidance of dispersion of the fuel beyond the localized portion of the chamber where combustion is desired. Thus, the increase in pressure due to combustion takes place largely in the neighborhood of top dead center, where its negative effect on the movement of the piston is small or non-existent, and maximum work may be obtained from its expansion.

The invention is illustrated in the attached drawing in which:

Figure 1 is a diagrammatical illustration of an engine cylinder with appurtenances including the fuel injection system;

Figure 2 is a diagram illustrating the rate at which the fuel is preferably injected in accordance with the invention; and, Figure 3 is a horizontal view looking upward in the cylinder of Figure 1, illustrating the location of the valves and fuel nozzle and the type of combustion occurring in the combustion space.

Referring to Figure 1, the engine cylinder is indicated at 10 with piston 11 and connecting rod 12 which runs to the usual crank shaft (not shown). The cylinder head is equipped with suitable ports controlled by intake valve 14 and an exhaust valve 15 (see Figure 3), and an opening receiving a spark plug 16 connected to a conventional ignition system. Communicating with the intake valve 14 is a conventional air-intake pipe or manifold which may contain a customary air filter (not shown). Communicating with the exhaust valve 15 is the customary exhaust pipe which may contain a suitable muffler (also not shown).

The fuel system comprises a suitable source of supply such as tank 18 from which the fuel is drawn through line 20 by means of a fuel pump indicated generally at 22. The fuel pump forces the fuel through line 24 under an elevated pressure in a manner to be described more fully hereinafter, to an injector 26. Line 24 may be equipped with a suitable heating means, shown as an electrical heating coil 30. The injector 26 may be of any suitable or conventional type, and that diagrammatically illustrated in the drawing is an injector of the type in which a spring-compressed pintle is raised to permit the flow of fluid into the nozzle by the pressure of the fuel entering the injector. This type of injector is commonly used for the injection of fuel into engines operating on the Diesel cycle, and therefore detailed illustration is thought to be unnecessary.

The fuel pump 22 may be of any suitable or conventional type adapted to force a fuel through the line 24 at a pressure such as to accomplish the variable rate of injection described herein. The pump also is preferably provided with means to vary the total amount of fuel so as to accomplish both part load and full load operation of the engine. The pump diagrammatically illustrated is preferably a conventional port-controlled plunger pump which is provided with an intake port, fuel chamber, by-pass port, check valve, and a plunger operated by a cam, the plunger being provided with a scroll or helix on its surface whereby the amount of fuel injected can be controlled by rotation of the plunger. Pumps of this type are well known in the art and are disclosed, for example, at pages 74 and 274 of the Diesel Engine catalog, Diesel Engines, Inc., New York, 1941, volume six. The fuel enters the fuel chamber through the intake port on the outward stroke of the plunger. Rotation of the cam starts the inward motion of the plunger, which closes the intake port and begins compression of the fuel. When the pressure on the fuel exerts a selected force slightly greater than the force exerted by the spring holding the check valve closed, the valve opens and the fuel flows to the injector. Depending upon the setting of the plunger scroll or helix, which is usually accomplished through a rack on the plunger, in relation to the by-pass port, when the desired amount of fuel has been injected the remainder of the fuel in the fuel chamber flows through the by-pass port, the pressure on the fluid in the fuel chamber is quickly released and the check valve controlling the flow of fuel to the fuel line is slammed shut. A pump of this type permits variation in the amount of fuel injected to permit full or part load operation, and the sharp termination of the feed of fuel under pressure sufficient to operate the injector.

In this type of pump, the cam is ordinarily so shaped in relation to the remainder of the fuel system as to cause the pump to force the fluid into the exit line at a relatively constant pressure. In accordance with the present invention, the pump plunger 32 is operated by a cam 34 disposed on a cam shaft 36, which may be interconnected to be driven by the engine in any conventional manner. It will be understood by those skilled in the art that the shape and speed of the rotation of the cam can be adjusted relative to the piston stroke to control the time of the application of pressure and to vary the pressure at which the fuel is supplied to the injector through line 24. As diagrammatically shown, the cam is shaped so as to force the fuel through line 24 at an initial pressure above the pressure required for operating injector 26, but at a pressure such that the rate of flow of fuel is small. Towards the end of the injection period, the pressure on the fuel is increased which results in a rapid increase in the rate of fuel injection into the cylinder of the engine.

The manner in which the fuel is preferably injected in accordance with the present invention is illustrated diagrammatically in Figure 2. The time from A to B, which may be measured in crank angle degrees and which may be varied as discussed below, represents the total injection period. The curve from A to point C represents the rate of fuel injection during the initial phase of the injection period. Due to the action of the pintle when opening, a small peak in the quantity of fuel is reached, and thereafter, during the first stages of injection, the rate of injection increases slowly. Beginning in the third quarter of the injection period, the rate of injection is increased rapidly so that the bulk of the fuel is injected between this point and the end of the period. The specific manner in which the fuel is injected will necessarily vary in accordance with a number of factors, such as the particular engine construction, the injection equipment available, and the like. It may be stated, however, by way of example, that the fuel may be injected at a rate such that 5 to 10 per cent of the total amount of fuel is injected during the first quarter of the injection period; 6 to 15 per cent during the second quarter; 20 to 30 per cent during the third quarter; and 50 to 65 per cent during the fourth quarter. The rate, of course, may and preferably will vary within the several partial periods. More generally, it is considered desirable that not more than one-third of the total amount of fuel should be injected during the first half of the injection period, and not less than two-thirds during the latter half.

In using a system such as that disclosed in Figure 1, comprising a port-controlled plunger pump, it will be understood that the injection of fuel over the entire injection period substantially as described will be best accomplished in full load operation, and for that reason, the invention is especially valuable for operating at full load. However, the advantages of the invention are attained to an important degree even under part load operation when using this system, since the rate of fuel injection will vary in the manner described during the period of injection, but the injection of fuel will be stopped at an earlier point in the cycle. Thus, the maximum rate of injection will be somewhat smaller than in full load operation, but otherwise, the rate of fuel injection will vary as described.

In determining the rate to be employed in a particular case, it will be understood that the fact that the fuel is injected in such manner as to form a combustible mixture with a localized portion of the air will be taken into account. Thus, the maximum rate of injection at any instant is limited by the amount of oxygen molecules available for admixture with the fuel at that instant. Since the density of the air is increasing during the period of compression, it will be seen that the permissible maximum rate of injection is highest near the end of the injection period.

The manner in which combustion is preferably accomplished will be understood more clearly by reference to Figure 3. The intake valve 14 is provided with a shroud 38 so positioned as to direct the incoming air in a tangential direction to produce a swirling movement of the air within the combustion space. In operation, a charge of air unmixed with fuel, or containing less than that amount of fuel which will support combustion, is drawn into the cylinder on the suction stroke of the piston 11. This air can be introduced at increased density or under boost pressure. This air, or dilute fuel-air mixture, is then compressed on the compression stroke of the piston, the swirling movement being continued.

Before top center, fuel is injected from injector 26 into the swirling air in a generally tangential direction, at an angle relative to the axis of the injector, and so that the edge of the spray form is closely adjacent to the electrodes of spark plug 16. Under the existing conditions, the fuel flash vaporizes or forms vapor very rapidly, this being especially true with respect to the edge of the spray form adjacent the spark plug, and the resulting vapor is intimately mixed with the swirling air to form a combustible mixture within a short travel of the fuel from the nozzle and about the time the resulting fuel vapor-air mixture reaches the plug 16.

As the first increment of injected fuel reaches the spark plug 16, a spark ignites this mixture, establishing a flame front. Following the first increment of fuel, the remainder of the fuel is injected in the manner previously described. Since the injection is begun before top dead center, the first small increments of fuel establish a flame front which provides good conditions for the combustion of the fuel injected later, but, at the same time, does not resist the movement of the rising piston to as large an extent as would be the case were larger increments injected.

It will be understood in carrying out the present invention, the conditions are adjusted and correlated so as to obtain the type of combustion described. Thus, the position of the spark plug in relation to the position and characteristics of the injector is selected so that the fuel forms a combustible fuel vapor-air mixture in a localized portion of the combustion space adjacent the spark plug while avoiding dissemination of the fuel throughout the combustion space. The first mixture formed should be immediately ignited and therefore care must be exercised that the ignition takes place at least at the time the first combustible mixture reaches the spark plug. Thus, the injection advance and ignition advance are carefully synchronized.

By proceeding in this way, it will be seen that the burning mixture will be cushioned on one side by the incombustible products of combustion, and on the other by air; therefore, the formation of highly-heated combustible "end gas" is avoided and detonation or knocking is not possible. Also, it will be seen that the flame front tends to move in the direction of fuel injection, although, because of the swirling, it is probable that the flame front is substantially stationary in relation to the cylinder wall.

The point in the cycle at which the injection is started may be varied over wide limits. In actual practice, the injection may be started as much as 75 crank angle degrees before top center; it may be about 40 degrees for maximum power where substantially all of the air within the combustion space is to be consumed. The duration of injection may also be varied, but preferably is terminated before top center. While it is possible to extend injection somewhat beyond top center, termination before this point is desirable, because, taking into account the time required for combustion, this will permit maximum combustion pressure increase at top dead center.

In practicing the invention, various ignition systems may be employed. It is desirable to employ an ignition system which has a spark duration of several crank angle degrees. It has been found that the conventional magneto system of the revolving coil type has a spark duration of about 5 to 30 crank angle degrees at an engine speed of 1800 R. P. M., and it is generally preferred to employ this system. While not all of this spark duration is of sufficient intensity to ignite the mixture, there is, nevertheless, an effective spark duration of appreciable length. By synchronizing the spark advance with the injection advance, a spark of ignitible intensity is created at the time the fuel vapor-air mixture reaches the electrodes of the spark plug. In any case, when the cylinder design and the location of the spark plug and the injector have been fixed, the required relationship between injection advance and spark advance may be determined. Since, in using conventional automotive circuits of the magneto type, a spark tolerance of about 5 to 15 degrees depending upon the characteristics of the circuits and the size of the plug gap may be obtained, there is a substantial period wherein satisfactory operation is possible. This is also true because the maximum spark advance may be set to precede the start of injection by as much as 5 to 10 degrees; while the full retard setting of the spark advance may be as much as 7 degrees or more after the start of fuel injection.

It will be understood that the relative location of the injector and spark plug, as shown in the drawings, is given merely by way of illustration and that the elements may be placed in other locations, provided controlled combustion is obtained. The location of the spark plug in relation to the location of the injector is an important consideration in the design of an engine of the type under consideration. In some measure, this appears to be due to the fact that many spray patterns comprise a rich core of fuel particles and the impingement of this core on the electrodes of the spark plug prevents effective ignition. By injecting at a low rate initially, opportunity for dispersion of this core and admixture of air therewith is afforded, which results in making the location of the spark plug in relation to the injector somewhat less critical.

It will also be seen that since satisfactory ignition of the fuel is dependent upon bringing a combustible fuel vapor-air mixture into contact with the electrodes of the spark plug, the conditions within the combustion chamber are somewhat different when starting at low temperatures than those existing when the engine has been running for some time. The injection of a relatively small amount of fuel at the beginning of the injection period is believed to improve the starting characteristics of the engine, because more effective vaporization of the small amount of fuel will be accomplished. This method of controlling the injection also appears to have the advantage, regardless of temperature, of avoiding the creation of an initial peak pressure when starting injection on each cycle. When the first increment of fuel is injected, there appears to be an unavoidable period of time required for this increment to burn and establish the flame front. This results in a momentary increase in pressure which resists the useful movement of the piston. By reducing the amount injected at the start of the injection period, the quantity of this momentary increase is decreased and the efficiency of operation is improved.

The present method is not restricted to the use of any particular compression ratios; however, one of the advantages of an engine of the type under consideration is that it can be operated at high compression ratios, and therefore such ratios will preferably be used. For example, compression ratios of the order of 10:1 or 12:1 and higher may be employed.

Although the fuel system specifically described is thought to be especially advantageous, other means for practicing the invention will be immediately apparent to those skilled in the art. For example, a constant pressure pump and a positively controlled valve could be used to secure the desired variable rate of fuel injection.

Also, the invention is not restricted with respect to combustion chamber design. Provided the desired mixture of fuel vapor and air in a localized portion of the combustion chamber is produced, and this is burned soon after formation, the particular combustion chamber design is unimportant.

Since this method of operation removes the restrictions imposed by detonation or knock, it will be understood that the fuel used may be any suitable fluid fuel of low or high octane, and may be liquid or gaseous at standard conditions. Examples of suitable fuels are gasoline, kerosene, and fuel oils. In connection with the use of these fuels it will be understood that the term "vapor" is used herein and in the claim in its broad sense to include fuels in the gas phase whether the fuels are normally liquids or gases.

Obviously many modifications and variations of the invention, as hereinbefore set forth, may be made without departing from the spirit and scope thereof, and therefore only such limitations should be imposed as are indicated in the appended claim.

I claim:

In the operation of a fuel-injection spark-ignition internal combustion engine on the Otto cycle with non-knocking combustion, wherein air is introduced into the engine cylinder combustion space in a manner to produce a high velocity induction air swirl therein, said air is compressed while maintaining the high velocity air swirl, fuel is injected into a localized portion of the swirling compressed air, within said combustion space, resulting combustible fuel vapor-air mixture from the first increment of injected fuel is promptly spark-ignited substantially as soon as formed to establish a flame front traveling counter to the direction of air swirl, and injection of fuel is continued into the swirling air shortly in advance of the traveling flame front to progressively form additional combustible fuel vapor-air mixture immediately in advance of the traveling flame front to be ignited thereby and burned substantially as rapidly as formed, the improvement which comprises starting the injection of fuel on a cycle by a fuel jet directed into the swirling compressed air at one side of said combustion space about 75-40° before top dead center of the compression stroke at a relatively low fuel injection rate, but which is sufficient to produce a spark-ignitible mixture with an impregnated localized portion of said swirling air to immediately establish said traveling flame front, continuing fuel injection on said cycle and during the said compression stroke by the said jet at a relatively low fuel injection rate into succeeding portions of the compressed swirling air at the said same side of the combustion space immediately in advance of the traveling flame front with prompt progressive combustion of the resulting combustible mixtures substantially as soon as formed, and finally completing injection on said cycle and prior to top dead center by the said jet at a relatively high fuel injection rate into additional succeeding portions of the compressed swirling air at the said same side of the combustion space and immediately in advance of the traveling flame front to progressively form richer localized mixtures which are combustible and are burned substantially as rapidly as formed, the rate of fuel injection on said cycle being such that not more than one-third of the total amount of fuel per cycle is injected during the first half of the injection period, and not less than two-thirds is injected during the latter half of the injection period, and the said rate is coordinated with a sufficient advance in the timing of injection prior to top dead center, such that the maximum pressure rise of the Otto cycle combustion occurs substantially at top dead center.

WILLIAM N. FENNEY.

REFERENCES CITED

The following references are of record in the file of this patent:

UNITED STATES PATENTS

| Number | Name | Date |
| --- | --- | --- |
| 2,012,086 | Mock | Aug. 20, 1935 |
| 1,167,376 | Bouteille | Jan. 11, 1916 |
| 1,305,579 | Wolfard | June 3, 1919 |
| 1,834,061 | Joachim | Dec. 1, 1931 |
| 2,003,814 | Taylor | June 4, 1935 |

FOREIGN PATENTS

| Number | Country | Date |
| --- | --- | --- |
| 600,008 | France | Jan. 28, 1936 |
| 113,026 | Austria | May 2, 1941 |